No. 698,991.  
F. L. MORSE.  
CHAIN WHEEL.  
(Application filed Apr. 13, 1901.)  
Patented Apr. 29, 1902.
(No Model.)
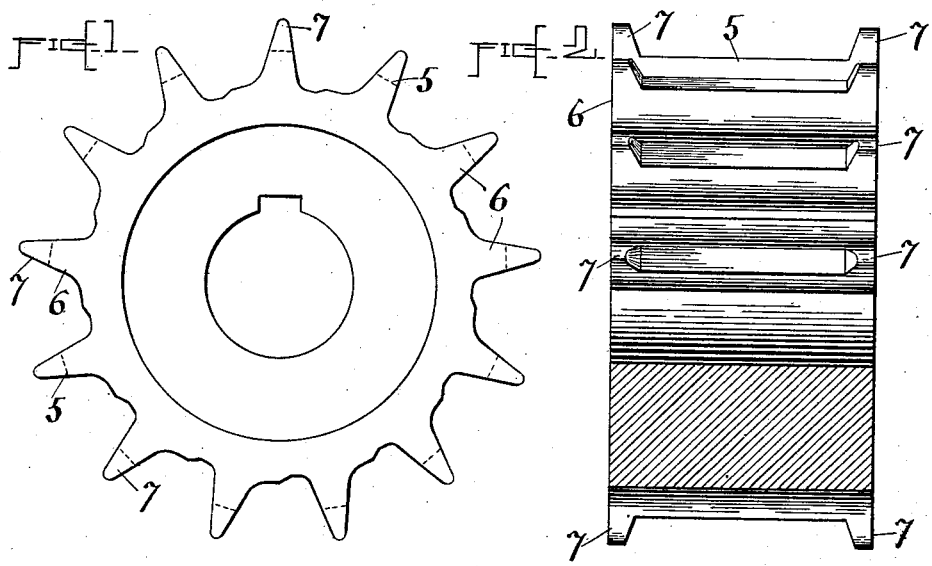
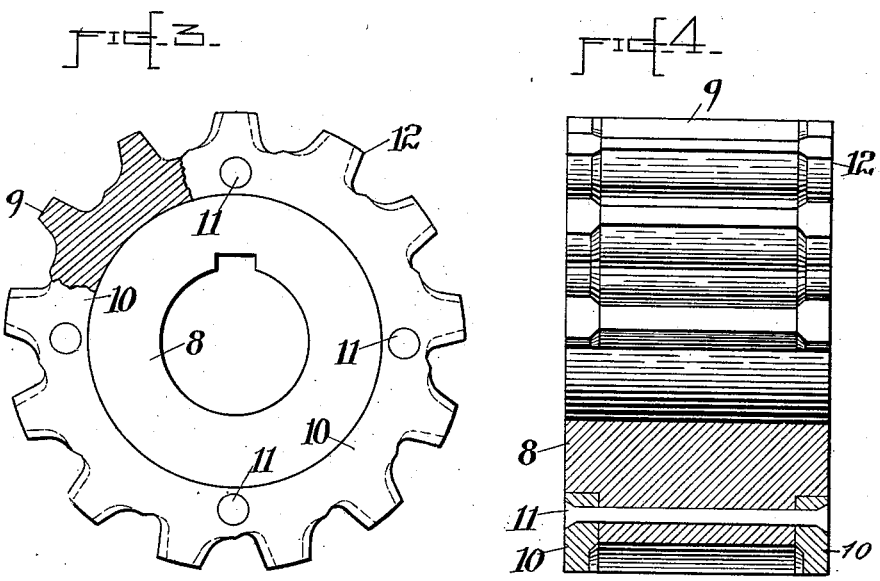
Witnesses:  
Otto Greenberg  
E. L. Lawler
Inventor  
Frank L. Morse  
By  
Townsend & Decker  
Attorneys

UNITED STATES PATENT OFFICE.

FRANK L. MORSE, OF TRUMANSBURG, NEW YORK, ASSIGNOR TO MORSE CHAIN COMPANY, OF TRUMANSBURG, NEW YORK.

CHAIN-WHEEL.

SPECIFICATION forming part of Letters Patent No. 698,991, dated April 29, 1902.

Application filed April 13, 1901. Serial No. 55,697. (No model.)

*To all whom it may concern:*

Be it known that I, FRANK L. MORSE, a citizen of the United States, and a resident of Trumansburg, in the county of Tompkins and State of New York, have invented certain new and useful Improvements in Chain-Wheels, of which the following is a specification.

This invention relates to an improvement in chain-wheels, and particularly to that class of chain-wheels commonly termed "sprocket-wheels."

The object of the invention is to provide a wheel of this class such as may be economically made and such as shall be perfectly safe in operation.

With these objects in view the invention consists in the formation and construction of chain-wheels, substantially as hereinafter described and claimed.

In the accompanying drawings, which form a part of this specification, Figure 1 illustrates in side view, and Fig. 2 in edge view, partially sectionized, a sprocket-wheel embodying the invention. Figs. 3 and 4 are like views, respectively, of a sprocket-wheel embodying the invention in a slightly-different form.

The chain-wheels to which this invention is especially applicable are those wherein the links of the chain arch over the teeth of the wheel or are provided with projections which extend into the spaces between the teeth. In wheels for this sort of chain-gearing it is desirable to have some means for preventing lateral displacement of the chains on the wheels. Such means are best provided by projections or flanges at the ends of the sprocket-teeth. These flanges or projections may be provided in various ways. In the wheel shown in Figs. 1 and 2 they are made as follows: Into the periphery of the wheel is first cut a groove, as indicated at 5, Fig. 2, whereby a flange is left at each side of the wheel. The wheel is then milled transversely to form the teeth 6, the transverse cuts for this purpose extending below the bottom of the groove 5. In this way the flange about the sides of the wheel at the ends of the teeth is formed into projections, such as indicated at 7. These projections are preferably outwardly beveled from their bottom toward their tops, as shown, thereby more easily and readily guiding the chain into the groove 5 and into proper engagement with the sprocket-teeth. While this is the most economical mode of formation for a sprocket-wheel embodying this invention, the said invention may be embodied in wheels otherwise constructed—for instance, as in the wheel shown in Figs. 3 and 4. Therein the body portion 8 of the wheel is transversely milled on its periphery or otherwise cut to form the main portion of the teeth, as indicated at 9. The body portion of the wheel may be reduced on its sides, near its periphery, for the reception of the rings 10, the outer peripheries of which rings are flush with the tops of the teeth 9. These rings are bolted or otherwise secured to the body of the wheel 8, as by bolts 11. Said rings 10 are milled transversely in a manner such as to provide teeth or projections of greater width than the teeth 9 and are outwardly beveled on their inner surfaces where they abut against the ends of said teeth 9, the outwardly-beveled portions of said teeth projecting beyond the width of the teeth 9, as indicated at 12. The flanges thus formed at the ends of the teeth serve the same purpose as the flanges or projections 7 in the form of wheel shown in Figs. 1 and 2.

Other changes in the construction and formation of sprocket-wheels embodying this invention may be made without departing from the spirit thereof.

I claim as my invention—

1. A chain-wheel having grooves extending transversely across the entire periphery of the wheel thereby leaving sprocket-teeth extending from side to side of the wheel, said teeth having guiding-flanges at their ends whereby the chain may be retained on the teeth.

2. A chain-wheel having a groove about its periphery leaving projecting ridges at the sides thereof and transverse channels extending from side to side of the wheel and sunk below the bottom of said groove thereby leaving teeth with outwardly-extending projections at their ends substantially as set forth.

Signed at Trumansburg, in the county of Tompkins and State of New York, this 9th day of April, A. D. 1901.

FRANK L. MORSE.

Witnesses:
L. BANTA,
JULIA L. SEELYE.